(12) United States Patent
Herrnberger et al.

(10) Patent No.: US 11,802,814 B2
(45) Date of Patent: Oct. 31, 2023

(54) METHOD AND DEVICE FOR IDENTIFYING AND DISTINGUISHING A CAUSE OF AT LEAST ONE MISFIRE OF AN INTERNAL COMBUSTION ENGINE

(71) Applicant: Vitesco Technologies GmbH, Hannover (DE)

(72) Inventors: Michael Herrnberger, Straubing (DE); Felix Emperhoff, Wiesent (DE)

(73) Assignee: Vitesco Technologies GmbH, Hannover (DE)

( * ) Notice: Subject to any disclaimer, the term of this patent is extended or adjusted under 35 U.S.C. 154(b) by 37 days.

(21) Appl. No.: 17/395,774

(22) Filed: Aug. 6, 2021

(65) Prior Publication Data

US 2021/0364390 A1     Nov. 25, 2021

Related U.S. Application Data

(63) Continuation of application No. PCT/EP2020/052038, filed on Jan. 28, 2020.

(30) Foreign Application Priority Data

Feb. 8, 2019  (DE) ...................... 10 2019 201 669.3

(51) Int. Cl.
   *G01M 15/11*   (2006.01)
(52) U.S. Cl.
   CPC .................................. *G01M 15/11* (2013.01)
(58) Field of Classification Search
   CPC ..................................................... G01M 15/11
   (Continued)

(56) References Cited

U.S. PATENT DOCUMENTS

| 5,377,536 A | 1/1995 | Angermaier |
| 6,338,326 B1 | 1/2002 | Ebeling |

(Continued)

FOREIGN PATENT DOCUMENTS

WO     9002874 A1     3/1990

OTHER PUBLICATIONS

International Search Report and Written Opinion dated May 8, 2020 from corresponding International Patent Application No. PCT/EP2020/052038.

(Continued)

*Primary Examiner* — Eric S. McCall

(57) ABSTRACT

The present disclosure relates to a method for detecting and distinguishing a cause of at least one combustion misfire of an internal combustion engine. The internal combustion engine has several cylinders, at least one exhaust gas tract, and an exhaust gas sensor which is arranged in the exhaust gas tract. The method includes the following steps: acquisition of a measurement signal with the exhaust gas sensor over a certain first period of time gas tract; subdivision of the measurement signal into measurement signal sections; assignment of the measurement signal sections to the corresponding cylinders, whereby cylinder-selective measurement signal profiles are produced that are characteristic of the respective oxygen content downstream of the respective cylinders over the determined first period of time of time; and evaluation of the cylinder-selective measurement signal profiles to detect at least one combustion misfire of the internal combustion engine.

14 Claims, 4 Drawing Sheets

(58) Field of Classification Search
USPC .................................................... 73/114.02
See application file for complete search history.

(56) References Cited

U.S. PATENT DOCUMENTS

| | | | |
|---|---|---|---|
| 7,031,828 B1* | 4/2006 | Thompson | F02D 41/1456 |
| | | | 701/101 |
| 7,801,671 B1* | 9/2010 | Pederson | G01M 15/11 |
| | | | 701/111 |
| 2016/0273463 A1 | 9/2016 | Doring et al. | |

OTHER PUBLICATIONS

German Office Action dated Oct. 15, 2019 for corresponding German Patent Application No. 10 2019 201 669.3.

* cited by examiner

METHOD AND DEVICE FOR IDENTIFYING AND DISTINGUISHING A CAUSE OF AT LEAST ONE MISFIRE OF AN INTERNAL COMBUSTION ENGINE

CROSS-REFERENCE TO RELATED APPLICATIONS

This application claims the benefit of PCT Application PCT/EP2020/052038, filed Jan. 28, 2020, which claims priority to German Application 10 2019 201 669.3, filed Feb. 8, 2019. The disclosures of the above applications are incorporated herein by reference.

TECHNICAL FIELD

The disclosure relates to a method and a device for detecting and distinguishing a cause of combustion misfires of an internal combustion engine with several cylinders, with at least one exhaust gas tract. An exhaust gas sensor is arranged in the at least one exhaust gas tract and its measurement signal is characteristic of the oxygen content in the exhaust gas of the internal combustion engine.

BACKGROUND

Combustion misfires occur if, in an internal combustion engine, for example, the amount of fuel supplied or the ignition energy is insufficient to ignite the air/fuel mixture. For example, there may be a fault in the injection system of the internal combustion engine, caused for example by an unintentional failure of the injection valve to open. This means that there is no ignitable mixture in the combustion chamber and this cylinder makes no contribution to the torque output by the internal combustion engine. The cause of the fault can, however, also lie in the ignition system of the internal combustion engine, for example due to the failure of an ignition spark between the electrodes of the spark plug. Faults in the ignition control, defective ignition coils or a shunt in the spark plug can also be causes of an ignition misfire and thus of a combustion misfire.

The occurrence of combustion misfires in an internal combustion engine can lead, on the one hand, to an increase in the emission rate of pollutants and, on the other hand, to the destruction of an exhaust gas catalytic converter located in the exhaust gas tract of the internal combustion engine or at least to an impairment of its conversion capacity due to post-reactions of the unburned air-fuel mixture.

The detection of such combustion misfires is therefore required by lawmakers as part of an on-board diagnosis in order to ensure compliance with the legal limit values for emissions during the operation of the internal combustion engine. Combustion misfires must be detected in the entire load and engine speed range. Detection of combustion misfires from the crankshaft speed measured by incremental encoders offers a cost-effective implementation.

A large number of methods have therefore already become known which, in order to detect combustion misfires, measure segment times which the crankshaft takes during the working cycles of the individual cylinders to pass through predetermined angular ranges. Uneven running values are then calculated from the segment times, and these values are compared with threshold values, where errors in the segment time measurement can be detected and corrected at times of overrun cut-off of the internal combustion engine. (e.g. EP 0 583 496 A1).

Combustion misfires lead to a temporary slowdown in the angular velocity of the crankshaft. Such combustion misfire detection methods, which check the uneven running of the internal combustion engine on the basis of the fluctuating rotational speed of the crankshaft, have the disadvantage that the observed fluctuations in the rotational speed can originate not only from the combustion process to be monitored, but also from external influences on the vehicle, such as occur for example when driving over an uneven stretch of road due to the resulting vibrations of the vehicle and due to vibrational excitations of the crankshaft. When so-called poor quality road sections occur, these uneven running-based detection methods do not provide any clear information about the presence or absence of combustion misfires and are therefore gated out.

Modern internal combustion engines have a dual-mass flywheel that has a first centrifugal mass, which is rigidly coupled to the crankshaft of the internal combustion engine, and a second centrifugal mass, which is coupled to the transmission via a clutch. The two centrifugal masses are coupled to one another in a torsionally flexible manner by way of springs. The dual-mass flywheel can thus be described as a spring-mass system. It has a natural frequency that is dependent on the spring constants, the masses of the first and second centrifugal masses and the coefficients of friction. At certain rotational speeds of the internal combustion engine, resonance phenomena can occur, which can affect the smoothness of running. Furthermore, during special driving maneuvers with high rotational speed gradients, mechanical components can jam within the dual-mass flywheel. This condition leads to extreme vibrations in the drive train in a defined load range. The associated increased measured uneven running of the internal combustion engine no longer permits reliable combustion misfire detection by a segment time-based uneven running value.

For this reason, when such an operating state occurs, the method for detecting combustion misfires, which is based on the evaluation of uneven running values, is gated out. The gating out is not deactivated again until after a certain minimum torque has been exceeded at the internal combustion engine, which leads to the jammed components of the dual-mass flywheel being reliably "torn free". This means that the phase of gating out of the uneven-running-based combustion misfire detection process is very long.

SUMMARY

The disclosure provides a method and a device with which reliable detection of at least one combustion misfire and with which a cause of the at least one combustion misfire in an internal combustion engine with several cylinders can be reliably distinguished.

A method for detecting and distinguishing a cause of at least one combustion misfire of an internal combustion engine, where the internal combustion engine has several cylinders, at least one exhaust gas tract and an exhaust gas sensor which is arranged in the exhaust gas tract is provided. The method includes the following step: acquisition of a measurement signal with the exhaust gas sensor over a certain first period of time. The measurement signal is characteristic of the oxygen content in the exhaust gas tract. The method also includes the steps of: subdivision of the measurement signal into measurement signal sections, assignment of the measurement signal sections to the corresponding cylinders, whereby cylinder-selective measurement signal profiles are produced that are characteristic of the respective oxygen content downstream of the respective cylinders over the determined first period of time of time, and evaluation of the cylinder-selective measurement signal profiles in order to detect at least one combustion misfire of the internal combustion engine. When the at least one combustion misfire is detected, an evaluation of the cylinder-selective measurement signal profiles takes place in order to distinguish the cause of the at least one combustion misfire.

Implementations of the disclosure may include one or more of the following optional features. The internal combustion engine has several cylinders. It is consequently conceivable that the internal combustion engine has two, three, four or even more cylinders. In some examples, the internal combustion engine has two or more cylinder banks, each of which has one or more of the cylinders. It is also conceivable that the internal combustion engine has several of the exhaust gas tracts. This can be the case, for example, if the internal combustion engine has several cylinder banks. In such a case, each of the cylinder banks can be assigned to one of the exhaust gas tracts.

The exhaust gas tract is set up to discharge an exhaust gas that is produced during the combustion of an air/fuel mixture in the cylinders from the cylinders of the internal combustion engine when the internal combustion engine is in operation. The exhaust gas tract is consequently arranged downstream of the cylinders of the internal combustion engine in the flow direction of the air/fuel mixture or the exhaust gas.

The exhaust gas sensor is arranged in the exhaust gas tract and is accordingly subjected to the exhaust gas from the cylinders. In some implementations, the exhaust gas sensor is arranged in the exhaust gas tract in such a way that it is subjected to the exhaust gas from all cylinders. Accordingly, with just a single exhaust gas sensor, it is possible to detect the at least one combustion misfire in all of the cylinders and to distinguish its cause. In some examples, it is also conceivable that several exhaust gas sensors are arranged in the internal combustion engine, which has several exhaust gas tracts, where at least one of the exhaust gas sensors is arranged in each case in at least one of the exhaust gas tracts. Accordingly, the combustion misfires in all of the cylinders can be detected and distinguished with a single one of the exhaust gas sensors in the respective exhaust gas tracts.

According to the present disclosure, the exhaust gas sensor measures the measurement signal over the determined first period of time. The measurement signal is characteristic here of the oxygen content in the exhaust gas, which is passed on into the exhaust gas tract downstream of the cylinder after the combustion or after the combustion has failed to take place.

If the combustion of the air/fuel mixture does not take place properly in one of the cylinders, as a result of which a combustion misfire occurs, the unburned air/fuel mixture is discharged into the exhaust gas tract and passes by the exhaust gas sensor with a time delay. The oxygen content of the exhaust gas of the unburned air/fuel mixture is not identical to the oxygen content of the exhaust gas of a properly burned air/fuel mixture. This difference can be measured by the exhaust gas sensor. From the measurement signal, which is characteristic of the oxygen content in the exhaust gas downstream of the cylinder, it can consequently be derived whether at least one combustion misfire has occurred in one of the cylinders upstream.

To assign the measured measurement signal to the corresponding cylinders, the measurement signal is divided into measurement signal sections. The combustion of the air/fuel mixture in the cylinders takes place one after the other, as a result of which exhaust gas packets that arise during the combustion in the cylinders are passed on one after the other from the cylinders into the exhaust gas tract. The exhaust gas tract is configured to combine the exhaust gas packets from the cylinders to form the exhaust gas, to transport the exhaust gas past the exhaust gas sensor and to discharge the exhaust gas from the internal combustion engine. The time that an exhaust gas packet takes to travel from the cylinder to the exhaust gas sensor can be determined, where it can also be determined which exhaust gas packet originates from which cylinder. Accordingly, the measurement signal can be subdivided into measurement signal sections corresponding to the number of cylinders upstream of the exhaust gas sensor and assigned thereto. By way of the subdivision and assignment, the cylinder-selective measurement signal profiles from the measurement signal sections can be combined. The cylinder-selective measurement signal profiles are consequently characteristic of the oxygen content in the exhaust gas packets over the first period of time of the cylinders arranged upstream of the exhaust gas sensor. If, for example, three of the cylinders are arranged upstream of the exhaust gas sensor, the measurement signal of the exhaust gas sensor is subdivided into three cylinder-selective measurement signals and assigned to the three cylinders, where a cylinder-selective measurement signal can be produced for each of these three cylinders. All the cylinders arranged upstream can be monitored individually by just a single exhaust gas sensor, which simplifies the entire process.

If, in some examples, the internal combustion engine has four cylinders and an exhaust gas sensor which is arranged downstream of the four cylinders, the measurement signal measured by the exhaust gas sensor can be divided into four cylinder-selective measurement signal profiles that are assigned to the four cylinders. The corresponding cylinder-selective measurement signal profiles, which are characteristic of the oxygen content of the exhaust gas packets from the four cylinders, can thus be determined from the measurement signal of the exhaust gas sensor. If a combustion misfire is detected, it can consequently be determined in a very simple and rapid manner in which of the cylinders the combustion did not take place properly.

In some examples, an initial parameter is taken into account when assigning the cylinder-selective measurement signal profiles to the corresponding cylinders. The initial parameter can for example indicate which of the cylinders releases the first exhaust gas packet into the exhaust gas tract at the beginning of the first period of time. The first period of time can, for example, also begin to run when the internal combustion engine is started. It is also conceivable that the initial parameter is provided to the method according to this disclosure from a control unit of the internal combustion engine. The initial parameter particularly makes it easier to correctly assign the corresponding measurement signal sections to the respective cylinder.

The cylinder-selective measurement signal profiles are evaluated in order to detect at least one combustion misfire of the internal combustion engine. The cylinder-selective measurement signal profiles are characteristic of the oxygen content in the respective exhaust gas packets from the respective cylinders. In the event of a combustion misfire, as explained above the oxygen content of the corresponding exhaust gas packet differs from the oxygen content of an exhaust gas packet which originates from a properly working cylinder. If one of the cylinder-selective measurement signal profiles consequently has a characteristic profile that deviates from a normal profile, it can consequently be concluded that a combustion misfire has occurred in the corresponding upstream cylinder. The normal profile can, for example, be stored in a memory and continuously compared with the cylinder-selective measurement signal profiles by a computing unit. The normal profile can also be depicted by a limit band or one or two threshold values. If at least one of the cylinder-selective measurement signal profiles exceeds or falls below, for example, one of the threshold values or moves out of the limit band, a combustion misfire can be deduced. Accordingly, it is possible to identify combustion misfires in a very simple manner and to assign them to the corresponding cylinders, solely by way of the evaluation of the measurement signal of the single exhaust gas sensor in the exhaust gas tract.

If, according to the method, at least one combustion misfire is detected, the cylinder-selective measurement signal profiles are also evaluated in order to distinguish the cause of the at least one combustion misfire. The evaluation of the cylinder-selective measurement signal profiles can start, for example, as soon as at least one combustion misfire is detected.

The combustion misfire can be, for example, an ignition misfire, as described above. In this case, the air/fuel mixture is not ignited and accordingly does not burn or does not burn completely and is passed on to the exhaust gas tract unburned or partially unburned. The oxygen content of such an unburned exhaust gas packet is characteristic in comparison with an exhaust gas packet from a properly functioning cylinder and can accordingly be detected from the corresponding cylinder-selective measurement signal profile.

The combustion misfire can, for example, also be an injection misfire, as described above. Too little or no fuel at all is injected into one of the cylinders, so that, for example, there is no ignitable air/fuel mixture in the cylinder at the time of ignition. This air/fuel mixture is also passed unburned or partially unburned into the exhaust gas system. The oxygen content of such an unburned exhaust gas packet is characteristic in comparison with an exhaust gas packet of a properly functioning cylinder and also in comparison with an exhaust gas packet of a cylinder in which the air/fuel mixture was not ignited and can accordingly be detected from the corresponding cylinder-selective measurement signal profile and distinguished from a characteristic cylinder-selective measurement signal profile which originates from an ignition misfire. It is consequently possible to distinguish the cause of the at least one combustion misfire and, for example, to identify it as an ignition misfire or as an injection misfire, solely by evaluating the cylinder-selective measurement signal profiles. This advantageously makes the detection and distinguishing of the at least one combustion misfire simple. In addition, the evaluation is independent of other mechanical components of the internal combustion engine, so that the evaluation can take place in any operating state of the internal combustion engine. As a result, other components that are arranged downstream of the exhaust gas sensor in the exhaust gas tract, such as for example an exhaust gas catalytic converter, can advantageously be protected in a simple manner. Additional components in the exhaust gas tract or on or in the internal combustion engine such as for example a crankshaft sensor are not necessary. This also simplifies the process.

In some examples, when the cylinder-selective measurement signal profiles are evaluated in order to identify that cylinder in which combustion has failed to occur, the cylinder-selective measurement signal profiles are compared with one another. The individual exhaust gas packets that are passed on from the cylinders into the exhaust gas tract can easily mix with one another. For example, the exhaust gas packet from the cylinder in which the combustion did not take place properly can influence the composition of preceding exhaust gas packets and/or the composition of subsequently occurring exhaust gas packets. This influence can be detected from the respective cylinder-selective measurement signal profiles. Accordingly, it can make sense to precisely identify the cylinder in which the combustion did not take place properly, in order to compare the respective cylinder-selective measurement signal profiles with one another. The comparison makes it possible to draw conclusions about the cylinder in which the combustion did not take place properly. This can increase the accuracy of the identification of the corresponding cylinder in which the combustion did not take place properly.

In some implementations, the combustion failed to occur in that cylinder whose cylinder-selective measurement signal profile has the largest signal deflection in comparison with the other cylinder-selective measurement signal profiles. When comparing the cylinder-selective measurement signal profiles to identify that cylinder in which the combustion did not take place properly, for example, the signal deflections of the respective cylinder-selective measurement signal profiles can be compared with one another. A signal deflection of a signal profile can be, for example, a local or a global maximum or minimum in the signal profile. If, for example, the oxygen content in the exhaust gas is characteristic due to a combustion misfire and is consequently reflected, for example, in three of four or four of four of the cylinder-selective measurement signal profiles, the level of the signal deflections (the height or depth of the local or global minimum or maximum) can be used in the four cylinder-selective measurement signal profiles to draw conclusions about the cylinder in which the combustion did not take place properly. The oxygen content in the exhaust gas packet that comes from the cylinder in which the combustion did not take place properly is, in some examples, the highest compared to the other oxygen contents of the adjacent exhaust gas packets, so that the signal deflection of the corresponding cylinder-selective measurement signal profile is most characteristic, for example at its highest or lowest, compared to the other cylinder-selective measurement signal profiles. Overall, it is consequently very easy to infer the cylinder in which the combustion did not take place properly by way of the height or the depth of the signal deflections of the cylinder-selective measurement signal profiles. According to this example, the combustion misfire occurred in that cylinder whose cylinder-selective measurement signal profile has the largest signal deflection compared to the other cylinder-selective measurement signal profiles. The identification of the corresponding cylinder is therefore advantageously simple.

In some examples, at least one of the combustion misfires is detected as soon as at least one of the cylinder-selective measurement signal profiles exceeds a first threshold value. The first threshold value can, for example, be stored in the memory and continuously compared with the corresponding cylinder-selective measurement signal profiles by the computing unit. In this way, it is very easily possible to identify combustion misfires from the corresponding cylinder-selective measurement signal profiles. In some examples, the cylinder-selective measurement signal profiles are additionally filtered, for example low-pass filtered, before they are compared with the first threshold value.

In some examples, to distinguish the cause of the at least one combustion misfire, at least one of the cylinder-selective measurement signal profiles is compared with a second threshold value. The second threshold value can, for example, also be stored in the memory and continuously compared with the corresponding cylinder-selective measurement signal profiles by the computing unit. The second threshold value can be higher or lower than the first threshold value. If, for example, based on the comparison with the first threshold value, it is detected that the combustion did not take place properly in one of the cylinders, the at least one cylinder-selective measurement signal profile can be compared with the second threshold value. The comparison can be based on whether the at least one cylinder-selective measurement signal profile exceeds or falls below the second threshold value or not. Correspondingly, conclusions can be drawn about the type of combustion misfire. This advantageously simplifies the distinguishing of the combustion misfire.

In some implementations, when a combustion misfire is detected, the combustion misfire is distinguished as an ignition misfire, provided that at least one of the cylinder-selective measurement signal profiles exceeds only the first threshold value of the threshold values.

In some implementations, when a combustion misfire is detected, the combustion misfire is identified as an injection misfire if at least one of the cylinder-selective measurement signal profiles exceeds the first threshold value and the second threshold value.

In some examples, the exhaust gas packet of a cylinder in which the combustion did not take place properly due to incorrect or non-occurred ignition has a higher oxygen content compared to an exhaust gas packet of a cylinder in which the combustion did not take place properly due to an incorrect injection or the absence of an injection, so that the corresponding cylinder-selective measurement signal profile, which is characteristic of the oxygen content, has a higher or lower signal deflection compared to a cylinder-selective measurement signal profile that is characteristic of an injection misfire. The second threshold value can accordingly be selected such that, depending on which type of combustion misfire the corresponding deflections of the cylinder-selective measurement signal profiles represent, they pass through the second threshold value from above or below or do not pass through the second threshold value from above or below. It is consequently possible to distinguish an ignition misfire from an injection misfire in a very simple manner.

In some examples, a cylinder-specific characteristic diagram which takes into account the rotational speed of the internal combustion engine is used to assign the measurement signal sections. In some examples, the diagram is a gas transit time characteristic diagram. The gas transit time is the time that an exhaust gas packet takes to travel from the cylinder to the position in the exhaust gas tract where the exhaust gas sensor is located and measures the measurement signal that is characteristic of the oxygen content in the exhaust gas packet. The gas transit time depends on a rotational speed of the internal combustion engine. Such a characteristic diagram for the individual gas transit times can be stored in the memory, for example. The method of the present disclosure can, for example, take into account the characteristic diagram and read out the appropriate gas transit time in accordance with the rotational speed and use it for the assignment of the cylinder-selective measurement signal sections. This means that the assignment can be carried out with advantageous precision. It is also conceivable that additional parameters, such as for example a load, are taken into account.

In some implementations, in order to detect at least one combustion misfire, the cylinder-selective measurement signal profiles are compared with a comparison value which is characteristic of a mean value of the corresponding cylinder-selective measurement signal profiles, where the mean value is determined over a second period of time which is longer than the first period of time. If, for example, several combustion misfires occur one after the other in a comparatively short period of time, it can be useful for the purpose of precise identification to compare the cylinder-selective measurement signal profiles with the comparison value that is characteristic of the mean value of the corresponding cylinder-selective measurement signal profiles. In some examples, it is also conceivable that the cylinder-selective measurement signal profiles are additionally filtered, for example low-pass filtered. It is also conceivable that an additional value is added to the comparison value and a combustion misfire is detected as soon as at least one of the cylinder-selective measurement signal profiles exceeds the comparison value plus the additional value. For example, the formation of the mean value enables results to be adjusted. As a result, several combustion misfires that occur, such as, one after the other, can advantageously be detected simply and precisely.

In some examples, a device for detecting and distinguishing the cause of combustion misfires in an internal combustion engine has a control unit which is designed to control an aforementioned method. The device can for example be an engine control unit. It is also conceivable that the device is part of the engine control unit or is installed as an additional control unit, for example in a vehicle with the internal combustion engine.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
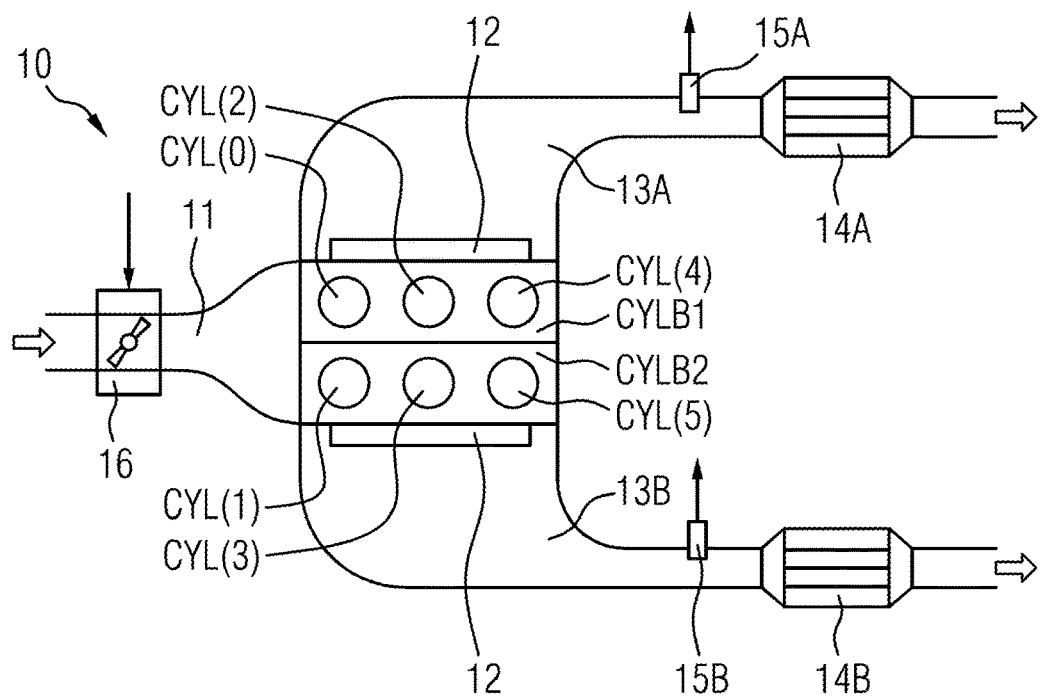
FIG. 1 shows a schematic block diagram of a multi-cylinder internal combustion engine.

FIG. 1 shows a schematic representation of an internal combustion engine 10 with six cylinders CYL(0)-CYL(5), where the internal combustion engine 10 may be configured to drive a vehicle, for example. The internal combustion engine 10 has a first cylinder bank CYLB1 and a second cylinder bank CYLB2, which are arranged parallel to one another. The cylinders CYL(0), CYL(2), CYL(4) are arranged in the first cylinder bank CYLB1, and the cylinders CYL(1), CYL(3), CYL(5) are arranged in the second cylinder bank CYLB2. The internal combustion engine 10 also has an intake tract 11 which is configured to supply air to the internal combustion engine 10. In this regard, the intake tract 11 has a throttle valve 16 which is configured to control the air supply. In addition, the internal combustion engine 10 has a fuel supply device 12 which is configured to supply the internal combustion engine 10 with fuel. The internal combustion engine 10 additionally has an exhaust gas tract 13A, 13B which is arranged immediately downstream of the cylinders CYL(0)-CYL(5) in the direction of flow through the internal combustion engine 10. The exhaust gas tract 13A, 13B may be divided into a first exhaust gas tract 13A and a second exhaust gas tract 13B. The first exhaust gas tract 13A is arranged downstream of the first cylinder block CYLB1 and the second exhaust gas tract 13B is arranged downstream of the second cylinder block CYLB2.

As shown in FIG. 1, a first exhaust gas sensor 15A is arranged in the first exhaust gas tract 13A, and a second exhaust gas sensor 15B is arranged in the second exhaust gas tract 13B. The exhaust gas sensors 15A, 15B are arranged downstream of the cylinders CYL(0)-CYL(5). A first exhaust gas catalytic converter 14A is additionally arranged in the first exhaust gas tract 13A and a second exhaust gas catalytic converter 14B is additionally arranged in the second exhaust gas tract 13B. The exhaust gas catalytic converters 14A, 14B are arranged downstream of the respective exhaust gas sensors 15A, 15B.

Figure 2:
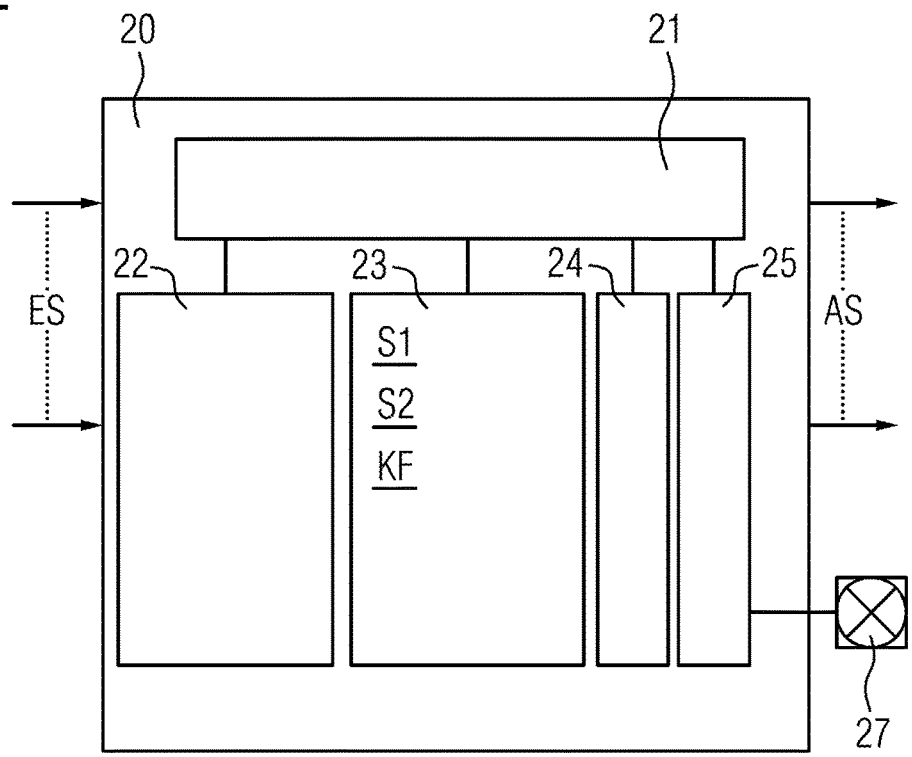
FIG. 2 shows a schematic representation of a control unit of an internal combustion engine.

FIG. 2 shows a control unit 20 in a schematic representation. The control unit 20 has a computing unit 21, a program memory 22, a memory 23, an air/fuel control device 24 and a fault memory 25. The control unit 20 is configured to output corresponding output signals AS from input signals ES and to control an internal combustion engine 10 accordingly. The control unit 20 can additionally be configured to actuate a fault display device 27, which is configured to display a fault, such as a combustion misfire V (not shown in FIG. 2), to a driver or to someone else. For example, a characteristic diagram KF, a first threshold value S1 and/or a second threshold value S2 can be stored in the memory 23. The characteristic diagram KF can be, for example, a gas flow characteristic diagram that is used to assign measurement signal sections MS_CYL_AB.

The control unit 20 can, for example, be an engine control unit which is configured to process a large number of data items and to actuate a wide variety of components of the internal combustion engine 10. The control unit 20 can accordingly also be configured to detect combustion misfires V of the internal combustion engine 10 and to distinguish their cause.

Figure 3:
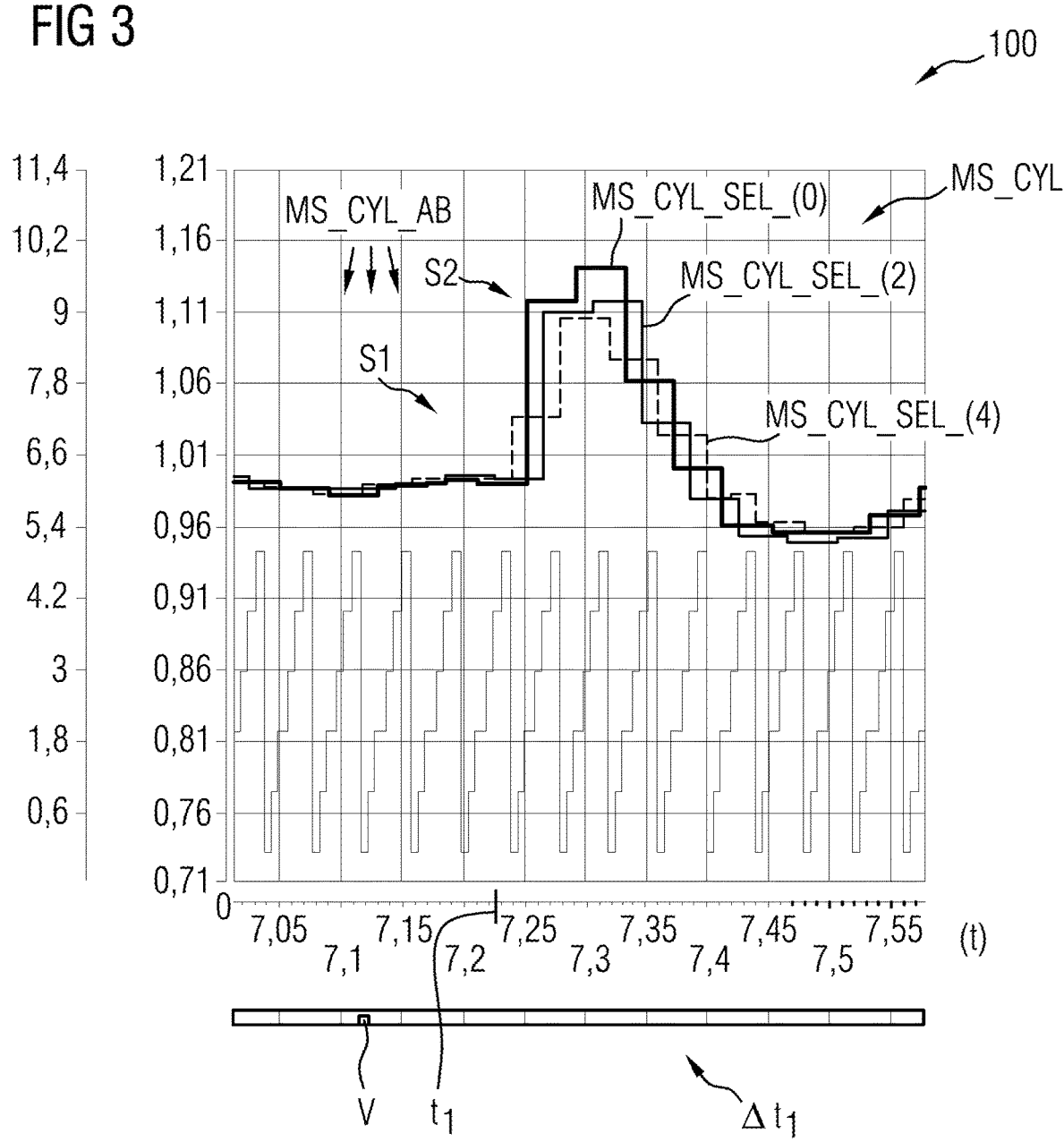
FIG. 3 shows a first diagram of the detection of combustion misfires in an internal combustion engine.
Figure 4:
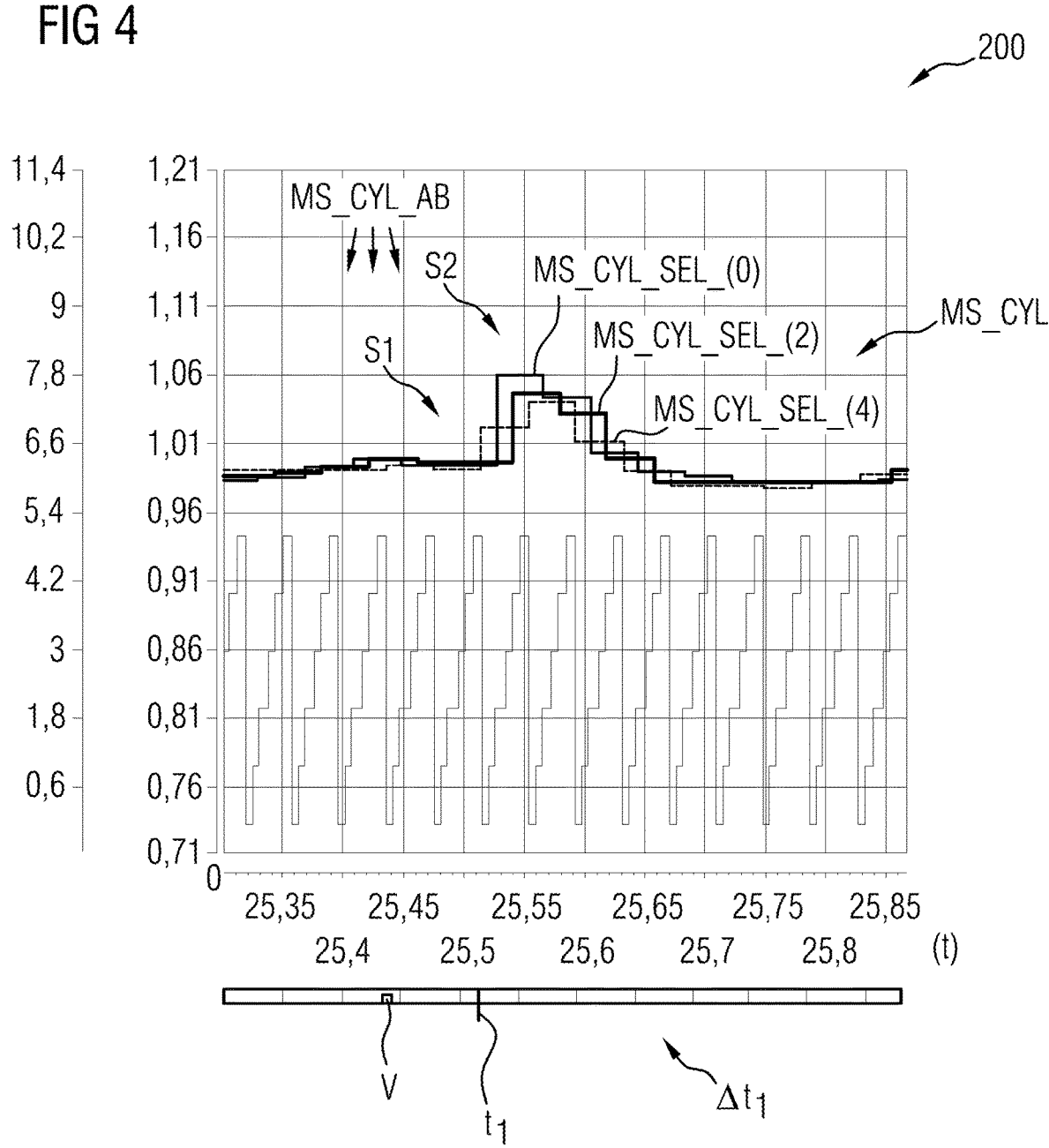
FIG. 4 shows a second diagram of the detection of combustion misfires in an internal combustion engine.

FIGS. 3 and 4 show a first diagram 100 and a second diagram 200 for detecting combustion misfires V in an internal combustion engine 10. According to these figures, a measurement signal MS_CYL of an exhaust gas sensor 15A, 15B is evaluated over a specific period of time Δt1. The measurement signal MS_CYL is characteristic of the oxygen content in an exhaust gas tract 13A, 13B of an internal combustion engine 10 downstream of cylinders CYL(0)-CYL(5). The measurement signal MS_CYL is then evaluated, for example, by the control unit 20 as shown in FIG. 2, in order to identify and subdivide combustion misfires V. For this purpose, the measurement signal MS_CYL is subdivided into measurement signal sections MS_CYL_AB. The measurement signal sections MS_CYL_AB are then assigned to the corresponding cylinders CYL(0)-CYL(5) so that cylinder-selective measurement signal profiles MS_CYL_SEL(0-5) are produced. The cylinder-selective measurement signal profiles MS_CYL_SEL(0-5) are consequently characteristic of the respective oxygen content in the exhaust gas tract 13A, 13B downstream of the respective cylinders CYL(0)-CYL(5). The cylinder-selective measurement signal profiles MS_CYL_SEL(0), MS_CYL_SEL (2), MS_CYL_SEL (4) of the cylinders CYL(0), CYL(2), CYL(4) are illustrated in FIGS. 1 and 2. It is conceivable that other cylinders CYL(0)-CYL(5) or all the cylinders CYL(0)-CYL(5) are also evaluated.

To detect at least one combustion misfire V, the cylinder-selective measurement signal profiles MS_CYL_SEL(0-5) are evaluated. In some examples, at least one of the combustion misfires V is detected as soon as at least one of the cylinder-selective measurement signal profiles MS_CYL_SEL(0-5) exceeds a first threshold value S1. The first threshold value S1 can, for example, be stored in the memory 23 of the control unit 20 and continuously compared with the cylinder-selective measurement signal profiles MS_CYL_SEL(0-5) by the control unit 20. In the diagrams 100, 200 in FIGS. 3 and 4, the cylinder-selective measurement signal profiles MS_CYL_SEL(0), MS_CYL_SEL (2), MS_CYL_SEL (4) are plotted over time t. The cylinder-selective measurement signal profiles MS_CYL_SEL(0), MS_CYL_SEL (2), MS_CYL_SEL (4) show signal deflections that begin at the time t1. For example, if at least one of the signal deflections exceeds the first threshold value S1, it is possible to infer a combustion misfire V that occurred a short time previously in one of the cylinders CYL(0)-CYL(5) arranged upstream. In the diagrams 100, 200 in FIGS. 3 and 4, the lower area in each case shows the time t at which the combustion misfire V occurred. Correspondingly, the combustion misfire V can be seen offset in time in the cylinder-selective measurement signal profiles MS_CYL_SEL(0), MS_CYL_SEL (2), MS_CYL_SEL (4).

To distinguish the cause of the combustion misfire V, the cylinder-selective measurement signal profiles MS_CYL_SEL(0-5) can be compared with a second threshold value S2. If the signal deflection of the cylinder-selective measurement signal profiles MS_CYL_SEL(0-5) exceeds the second threshold value S2, the combustion misfire V can be identified as an injection misfire, and if the signal profile of the cylinder-selective measurement signal profiles MS_CYL_SEL(0-5) does not exceed the second threshold value S2, the combustion misfire V can be identified as an ignition misfire. Diagram 100 in FIG. 3 shows the signal deflections which exceed the second threshold value S2, and consequently the combustion misfire V can be identified as an injection misfire according to this example. The diagram 200 in FIG. 4 shows the signal deflections which do not exceed the second threshold value S2, and consequently the combustion misfire V can be identified as an ignition misfire according to this example.

Figure 5:
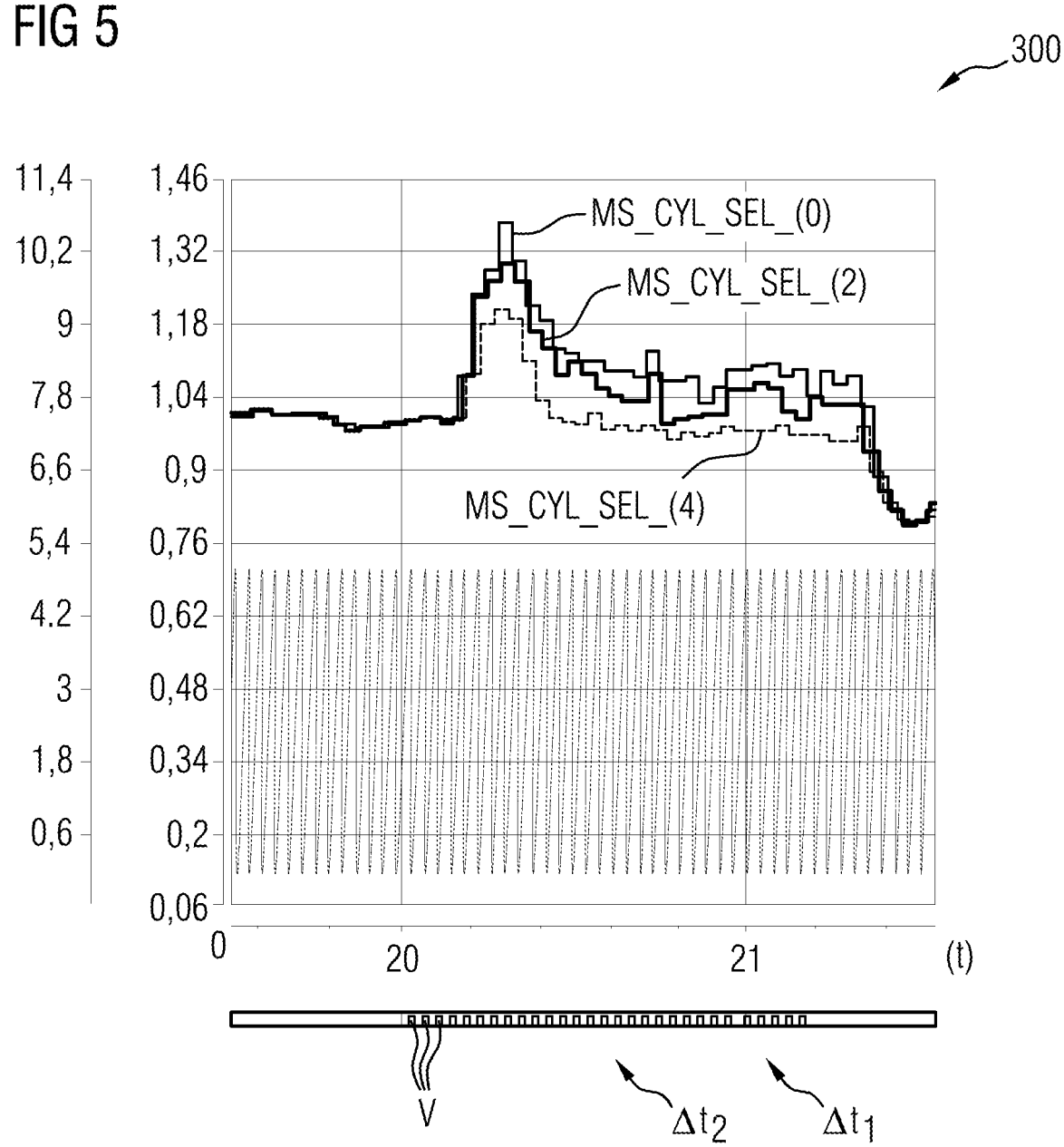
FIG. 5 shows a third diagram of the detection of combustion misfires in an internal combustion engine.

FIG. 5 shows a third diagram 300 which differs from the second diagram 200 and the first diagram 100 in that several combustion misfires V follow one another in a short time. Accordingly, the signal deflections of the cylinder-selective measurement signal profiles MS_CYL_SEL(0), MS_CYL_SEL (2), MS_CYL_SEL (4) shown deviate from one another to a relatively large extent. For the purpose of precise detection of the combustion misfires V, it may be appropriate to compare the cylinder-selective measurement signal profiles MS_CYL_SEL(0), MS_CYL_SEL (2), MS_CYL_SEL (4) with a comparison value that is characteristic of a mean value of the corresponding cylinder-selective measurement signal profiles MS_CYL_SEL(0), MS_CYL_SEL (2), MS_CYL_SEL (4), where the mean value is determined over a second period of time Δt2, which is longer than the first period of time Δt1.

A number of implementations have been described. Nevertheless, it will be understood that various modifications may be made without departing from the spirit and scope of the disclosure. Accordingly, other implementations are within the scope of the following claims.

What is claimed is:

1. A method for detecting and distinguishing a cause of at least one combustion misfire of an internal combustion engine, the internal combustion engine having several cylinders, at least one exhaust gas tract, and an exhaust gas sensor arranged in the exhaust gas tract, the method comprising the following steps:
   acquisition of a measurement signal with the exhaust gas sensor over a first period of time, the measurement signal is characteristic of oxygen content in the exhaust gas tract;
   subdivision of the measurement signal into measurement signal sections;
   assignment of the measurement signal sections to corresponding cylinders, whereby cylinder-selective measurement signal profiles are produced that are characteristic of the respective oxygen content downstream of the respective cylinders over the first period of time; and
   evaluation of the cylinder-selective measurement signal profiles to detect at least one combustion misfire of the internal combustion engine;
   wherein, when the at least one combustion misfire is detected, an evaluation of the cylinder-selective measurement signal profiles takes place in order to distinguish the cause of the at least one combustion misfire,
   wherein, during the evaluation of the cylinder-selective measurement signal profiles in order to identify that cylinder in which the combustion misfire failed, the cylinder-selective measurement signal profiles can be compared with each other, and
   wherein the combustion misfire failed in that cylinder whose cylinder-selective measurement signal profile has a largest signal deflection compared with the other cylinder-selective measurement signal profiles.

2. The method of claim 1, wherein a cylinder-specific characteristic diagram which takes into account a rotational speed of the internal combustion engine is used to assign the measurement signal sections.

3. The method of claim 1, wherein, in order to detect at least one combustion misfire, the cylinder-selective measurement signal profiles are compared with a comparison value which is characteristic of a mean value of the corresponding cylinder-selective measurement signal profiles, wherein the mean value is determined over a second period of time which is longer than the first period of time.

4. The method of claim 1, wherein the at least one combustion misfire is detected as soon as at least one of the cylinder-selective measurement signal profiles exceeds a first threshold value.

5. The method of claim 4, wherein, in order to distinguish the cause of the at least one combustion misfire, at least one of the cylinder-selective measurement signal profiles is compared with a second threshold value.

6. A method for detecting and distinguishing a cause of at least one combustion misfire of an internal combustion engine, the internal combustion engine having several cylinders, at least one exhaust gas tract, and an exhaust gas sensor arranged in the exhaust gas tract, the method comprising the following steps:
   acquisition of a measurement signal with the exhaust gas sensor over a first period of time, the measurement signal is characteristic of oxygen content in the exhaust gas tract;
   subdivision of the measurement signal into measurement signal sections;
   assignment of the measurement signal sections to corresponding cylinders, whereby cylinder-selective measurement signal profiles are produced that are characteristic of the respective oxygen content downstream of the respective cylinders over the first period of time; and
   evaluation of the cylinder-selective measurement signal profiles to detect at least one combustion misfire of the internal combustion engine;
   wherein, when the at least one combustion misfire is detected, an evaluation of the cylinder-selective measurement signal profiles takes place in order to distinguish the cause of the at least one combustion misfire,
   wherein at least one of the combustion misfires is detected as soon as at least one of the cylinder-selective measurement signal profiles exceeds a first threshold value,
   wherein, in order to distinguish the cause of the at least one combustion misfire, at least one of the cylinder-selective measurement signal profiles is compared with a second threshold value, and
   wherein, when the at least one combustion misfire is detected, the one combustion misfire is detected as an ignition misfire if at least one of the cylinder-selective measurement signal profiles only exceeds the first threshold value of the threshold values.

7. The method of claim 6, wherein, when the at least one combustion misfire is detected, the combustion misfire is detected as an injection misfire if at least one of the cylinder-selective measurement signal profiles exceeds the first threshold value and exceeds the second threshold value.

8. A device for detecting and distinguishing a cause of at least one combustion misfire of an internal combustion engine, the internal combustion engine having several cylinders, at least one exhaust gas tract, and an exhaust gas sensor arranged in the exhaust gas tract, the device comprising:
   a control unit configured to execute a method, the method comprising:
      acquisition of a measurement signal with the exhaust gas sensor over a first period of time, the measurement signal is characteristic of oxygen content in the exhaust gas tract;
      subdivision of the measurement signal into measurement signal sections;
      assignment of the measurement signal sections to corresponding cylinders, whereby cylinder-selective measurement signal profiles are produced that are characteristic of the respective oxygen content downstream of the respective cylinders over the first period of time; and
      evaluation of the cylinder-selective measurement signal profiles to detect at least one combustion misfire of the internal combustion engine;
      wherein, when the at least one combustion misfire is detected, an evaluation of the cylinder-selective measurement signal profiles takes place in order to distinguish the cause of the at least one combustion misfire,
      wherein, during the evaluation of the cylinder-selective measurement signal profiles in order to identify that cylinder in which the combustion misfire failed, the cylinder-selective measurement signal profiles can be compared with each other, and
      wherein the combustion misfire failed in that cylinder whose cylinder-selective measurement signal profile has a largest signal deflection compared with the other cylinder-selective measurement signal profiles.

9. The device of claim 8, wherein a cylinder-specific characteristic diagram which takes into account a rotational speed of the internal combustion engine is used to assign the measurement signal sections.

10. The device of claim 8, wherein, in order to detect at least one combustion misfire, the cylinder-selective measurement signal profiles are compared with a comparison value which is characteristic of a mean value of the corresponding cylinder-selective measurement signal profiles, wherein the mean value is determined over a second period of time which is longer than the first period of time.

11. The device of claim 8, wherein the at least one combustion misfire is detected as soon as at least one of the cylinder-selective measurement signal profiles exceeds a first threshold value.

12. The device of claim 11, wherein, in order to distinguish the cause of the at least one combustion misfire, at least one of the cylinder-selective measurement signal profiles is compared with a second threshold value.

13. A device for detecting and distinguishing a cause of at least one combustion misfire of an internal combustion engine, the internal combustion engine having several cylinders, at least one exhaust gas tract, and an exhaust gas sensor arranged in the exhaust gas tract, the device comprising:

a control unit configured to execute a method, the method comprising:

acquisition of a measurement signal with the exhaust gas sensor over a first period of time, the measurement signal is characteristic of oxygen content in the exhaust gas tract;

subdivision of the measurement signal into measurement signal sections;

assignment of the measurement signal sections to corresponding cylinders, whereby cylinder-selective measurement signal profiles are produced that are characteristic of the respective oxygen content downstream of the respective cylinders over the first period of time; and evaluation of the cylinder-selective measurement signal profiles to detect at least one combustion misfire of the internal combustion engine;

wherein, when the at least one combustion misfire is detected, an evaluation of the cylinder-selective measurement signal profiles takes place in order to distinguish the cause of the at least one combustion misfire, wherein at least one of the combustion misfires is detected as soon as at least one of the cylinder-selective measurement signal profiles exceeds a first threshold value wherein, in order to distinguish the cause of the at least one combustion misfire, at least one of the cylinder-selective measurement signal profiles is compared with a second threshold value, wherein, when the at least one combustion misfire is detected, the one combustion misfire is detected as an ignition misfire if at least one of the cylinder-selective measurement signal profiles only exceeds the first threshold value of the threshold values.

14. The device of claim 13, wherein, when the at least one combustion misfire is detected, the combustion misfire is detected as an injection misfire if at least one of the cylinder-selective measurement signal profiles exceeds the first threshold value and exceeds the second threshold value.

* * * * *